US010137528B2

(12) United States Patent
McCallum et al.

(10) Patent No.: US 10,137,528 B2
(45) Date of Patent: Nov. 27, 2018

(54) BLANK ETCHING FIXTURE

(71) Applicants: Scott R. McCallum, Alto, MI (US); Charles Slagter, Greenville, MI (US); Jordan A. Klein, Grand Rapids, MI (US); James K. Feutz, Belmont, MI (US)

(72) Inventors: Scott R. McCallum, Alto, MI (US); Charles Slagter, Greenville, MI (US); Jordan A. Klein, Grand Rapids, MI (US); James K. Feutz, Belmont, MI (US)

(73) Assignee: AUTODIE LLC, Grand Rapids, MI (US)

( * ) Notice: Subject to any disclaimer, the term of this patent is extended or adjusted under 35 U.S.C. 154(b) by 664 days.

(21) Appl. No.: 14/570,654

(22) Filed: Dec. 15, 2014

(65) Prior Publication Data
US 2016/0167167 A1 Jun. 16, 2016

(51) Int. Cl.
*B23K 26/06* (2014.01)
*B23K 26/362* (2014.01)
(Continued)

(52) U.S. Cl.
CPC ...... *B23K 26/0661* (2013.01); *B23K 26/0087* (2013.01); *B23K 26/066* (2015.10);
(Continued)

(58) Field of Classification Search
None
See application file for complete search history.

(56) References Cited

U.S. PATENT DOCUMENTS

| 3,848,495 A | 11/1974 | Youra |
| 3,981,605 A | 9/1976 | Wirsing |

(Continued)

FOREIGN PATENT DOCUMENTS

| EP | 1118400 A2 | 7/2001 |
| EP | 1145797 A2 | 10/2001 |

OTHER PUBLICATIONS

Harvey E C et al: "Fabrication Techniques and Their Application to Produce Novel Micromachined Structures and Devices Using Excimer Laser Projection", Optomechatronic Micro/Nano Devices and Components II: Oct. 8-10, 2007, Lausanne, Switzerland, vol. 3223, Sep. 29, 1997, pp. 26-33.

(Continued)

*Primary Examiner* — Sylvia MacArthur
(74) *Attorney, Agent, or Firm* — Ralph E. Smith

(57) ABSTRACT

A blank etching apparatus is provided that positions an etching screen relative to a blank. The blank etching apparatus includes a worktable having a table top and a base. The table top has a pair of lateral sides and a pair of longitudinal sides. A first jig is movable with respect to the table top along an x-axis. The first jig includes a first pair of lateral segments and a first pair of longitudinal segments. A screen frame is received between the first pair of longitudinal segments and the first pair of lateral segments of the first jig. The screen frame is moveable relative to the first jig and the table top along a y-axis. The screen frame receives and carries the etching screen and cooperates with the first jig to accurately and repeatably position the etching screen relative to the blank.

19 Claims, 7 Drawing Sheets

(51) Int. Cl.
  B23K 37/04    (2006.01)
  B23K 26/00    (2014.01)
  B23K 26/08    (2014.01)
  B23K 26/066   (2014.01)
  B23K 26/361   (2014.01)
(52) U.S. Cl.
  CPC ........ *B23K 26/0853* (2013.01); *B23K 26/361* (2015.10); *B23K 26/362* (2013.01); *B23K 37/0408* (2013.01)

(56) References Cited

U.S. PATENT DOCUMENTS

| | | | |
|---|---|---|---|
| 4,593,469 A | | 6/1986 | Shoup, II |
| 4,676,492 A | | 6/1987 | Shamir |
| 6,932,007 B1 | | 8/2005 | Beauchamp |
| 6,984,803 B1 | | 1/2006 | Gamier et al. |
| 2008/0196608 A1 | * | 8/2008 | Ojima ..................... B41F 15/34 101/127 |
| 2010/0206189 A1 | * | 8/2010 | Moncavage ............ B41F 15/40 101/129 |
| 2016/0167167 A1 | * | 6/2016 | McCallum ......... B23K 26/0661 156/345.51 |

OTHER PUBLICATIONS

International Search Report and Written Opinion dated Jun. 10, 2016 for International Application No. PCT/US2015/065567, International Filing Date Dec. 14, 2015.

* cited by examiner

BLANK ETCHING FIXTURE

FIELD

The subject disclosure generally relates to a blank etching apparatus that positions an etching screen relative to a blank.

BACKGROUND

This section provides background information related to the subject disclosure, which is not necessarily prior art.

In the automotive industry, etching is used to study the movement of material in a sheet metal blank, which occurs when the sheet metal blank undergoes one or more manufacturing processes. Such manufacturing processes may include, without limitation, sheet metal stamping. A repeating pattern of geometric units is applied to the sheet metal blank when the sheet metal blank is flat and before the sheet metal blank undergoes the one or more manufacturing processes. After the one or more manufacturing processes are carried out, the repeating pattern of geometric units that have been etched on the sheet metal blank are examined for distortions and irregularities as the same visually indicate where the material of the sheet metal blank has moved (i.e. has been deformed) by the one or more manufacturing processes. Typically, such distortions and irregularities are great in areas where the sheet metal blank has been bent, compressed, or stretched by the one or more manufacturing processes. Examination of the etched sheet metal blank may occur digitally, where electronic images of the sheet metal blank are processed by a machine and/or a computer to identify and analyze distortions. From this information, stress, strain, and other values can be calculated. The accuracy of these calculations however are highly dependent upon the uniformity of the original etching. Accordingly, sheet metal blanks with etching errors (i.e. variations in the repeating pattern of geometric units) must be discarded.

Known etching processes call for the use of an etching screen, which may be for example, a laser etching screen. A print head or electrically charged roller moves over the etching screen and applies multiple geometric units to the sheet metal blank, creating an etched section. The etched section is typically much smaller than the sheet metal blank so the etching screen must be repositioned by hand many times to create a grid of etched sections that spans much if not all of the sheet metal blank. Because care must be taken to re-position the etching screen so that the repeating pattern of geometric units is uniform across the sheet metal blank, the etching process is slow, often taking approximately eight hours to etch one sheet metal blank. Additionally, due to the free-hand positioning of the etching screen on the sheet metal blank, etching errors regularly occur, requiring the operator to discard the improperly etched blank and start over. As a result, both the discarded blank and the operator's time are wasted.

SUMMARY

This section provides a general summary of the subject disclosure and is not a comprehensive disclosure of its full scope or all of its features.

A blank etching apparatus is provided that positions an etching screen relative to a blank. Accordingly, the subject blank etching apparatus is an alternative to the free-hand positioning of the etching screen on the blank. The blank etching apparatus includes a worktable having a table top and a base that supports the table top. The table top has a top surface that supports the blank in a support plane. An x-axis and a y-axis is defined within the support plane. The table top has a pair of lateral sides and a pair of longitudinal sides that extend between the pair of lateral sides. The blank etching apparatus includes a first jig that is movable with respect to the table top along the x-axis. Although the first jig can traverse the table top along the x-axis, the first jig cannot move relative to the table top along the y-axis. The first jig includes a first pair of lateral segments that are disposed adjacent the pair of lateral sides of the table top and a first pair of longitudinal segments that extend between the first pair of lateral segments. The blank etching apparatus also includes a screen frame that is received between the first pair of longitudinal segments and the first pair of lateral segments of the first jig. The screen frame is moveable along the y-axis relative to the first jig and the table top. The screen frame receives and carries the etching screen and the first jig and the screen frame cooperate to accurately and repeatably position the etching screen relative to the blank.

Advantageously, the subject blank etching apparatus helps reduce or eliminate the etching errors caused by free-hand positioning of the etching screen on the blank. This minimizes the amount of blanks that must be discarded and in turn saves the wasted man hours associated with a discarded blank. The subject blank etching apparatus also has been found to increase the efficiency of the blank etching process four-fold. Specifically, the Applicants' have found that a single blank can be etched in approximately two hours versus the eight hours required when using known etching processes. Additionally, the subject blank etching apparatus ensures an accurate and uniform etching that is repeatable across the blank itself and between multiple blanks. This level of consistency was previously unobtainable and results in improved distortion information and cost savings.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
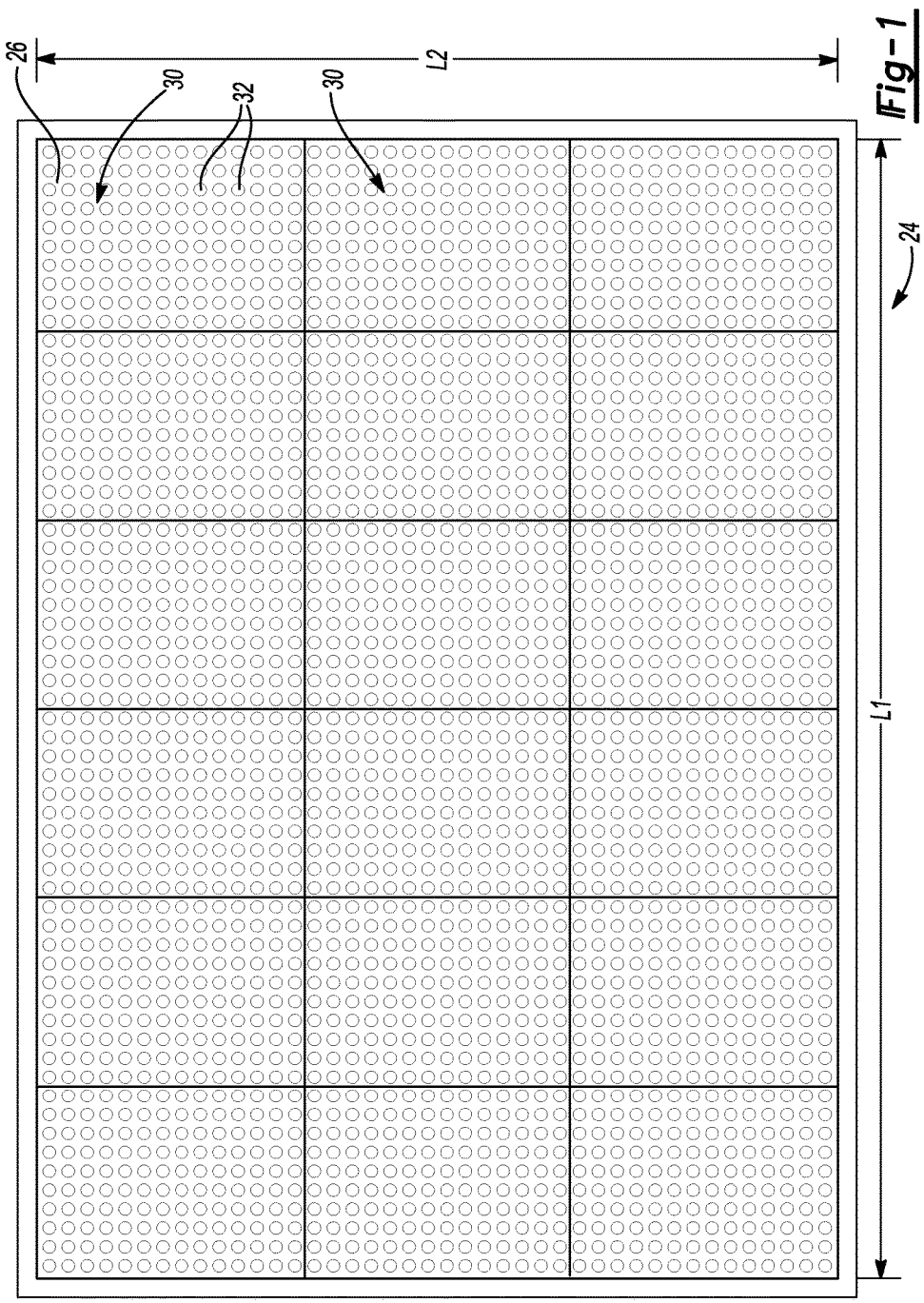
FIG. 1 is a top elevation view of an exemplary blank that has been properly etched.

Referring to the Figures, wherein like numerals indicate corresponding parts throughout the several views, a blank etching apparatus 20 is disclosed that positions an etching screen 22 relative to a blank 24.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 6A:
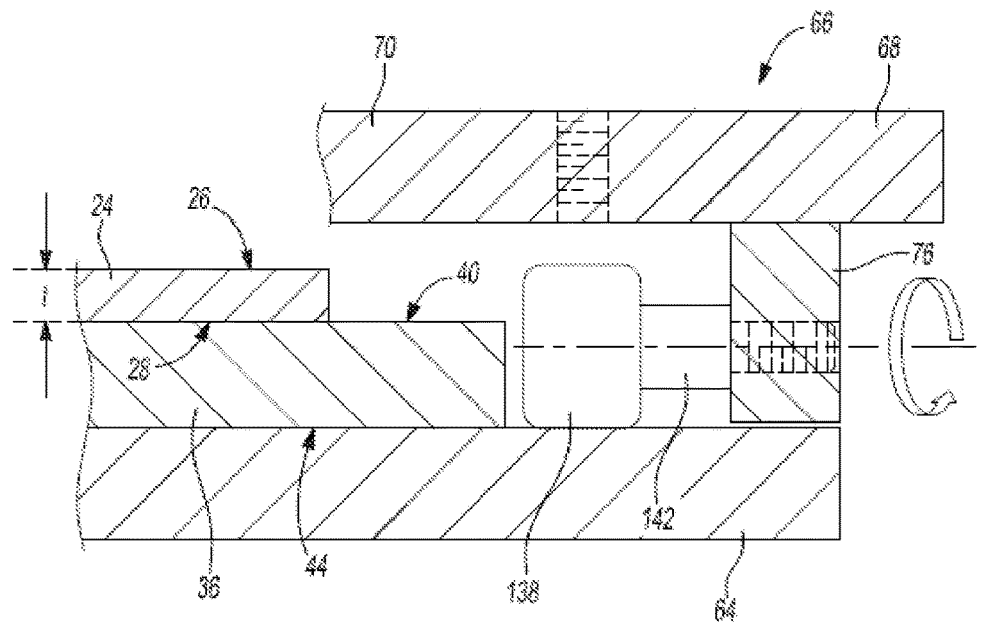
FIG. 6A is a partial side cross-sectional view taken along Line 6A-6A of the exemplary blank etching apparatus shown in FIG. 5A illustrating an exemplary roller configuration.
Figure 6B:
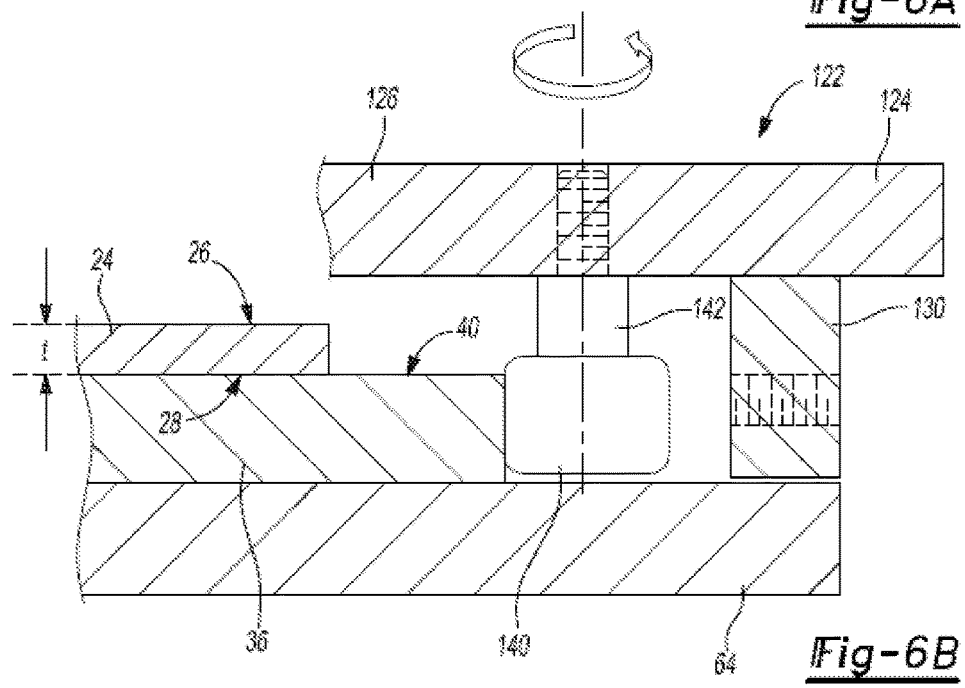
FIG. 6B is a partial side cross-sectional view taken along Line 6B-6B of the exemplary blank etching apparatus shown in FIG. 5B illustrating another exemplary roller configuration.

With reference to FIGS. 1, 6A, and 6B, a blank 24 is illustrated that has undergone an etching process. By way of example and without limitation, the blank 24 may be a sheet metal blank 24 that has undergone a laser etching process. The blank 24 may take a variety of different forms and may be made of a variety of different materials. Similarly, the etching process is not limited to laser etching, but may be one of the many known etching processes. The blank 24 is generally planar (i.e. flat) when it undergoes etching. Without limitation, the blank 24 may be a square or rectangular piece of sheet metal. Accordingly, the blank 24 may generally have a lateral length L1, a longitudinal length L2, and a thickness t that is substantially uniform and that is much smaller than the lateral length L1 and the longitudinal length L2 of the blank 24. The blank 24 also includes a first face 26 and a second face 28 that is opposite the first face 26. Typically, only the first face 26 or the second face 28 of the blank 24 is etched; however, the blank 24 may be etched on both the first face 26 and the second face 28 if desired.

In FIG. 1, only the first face 26 of the blank 24 has been etched. The etching itself may form a variety of different designs. As illustrated in FIG. 1, the etching comprises a grid of etched sections 30 where each one of the etched sections 30 comprises a repeating pattern of geometric units 32. By way of example and without limitation, each geometric unit 32 may be a square box containing four circles. The four circles are tangent to one another and the square box such that each of the four circles touch each other at one tangent point and the square box at two different tangent points. Again, this configuration for the geometric unit 32 is merely exemplary and many other designs are envisioned and considered within the scope of the subject disclosure.

Each etched section 30 of the grid is ideally aligned with adjacent etched sections 30 on the blank 24 so that there is no gap or space between adjacent etched sections 30. In this way, the repeating pattern of geometric units 32 is uniform across the lateral length and the longitudinal length of the blank 24. Such uniformity is particularly important where the etched blank 24 is to be used to study the movement of material after the blank 24 has undergone a manufacturing process, such as stamping and/or other deformation processes, for example. Because the repeating pattern of geometric units 32 is uniform when the blank 24 has been etched properly, as illustrated in FIG. 1, movement of the material forming the blank 24 that occurs when the blank 24 is subject to the manufacturing process can be visually and/or digitally determined by observing where the repeating pattern of geometric units 32 has been distorted (e.g. stretched, compressed, and/or warped). Where digital inspection of the blank 24 is conducted, electronic photography may be used and processed by a machine or computer to identify distortions. This process is extremely sensitive to minor variations in the repeating pattern of geometric units 32 so accurate results depend on the quality (i.e. uniformity) of the initial grid of etched sections 30 on the blank 24.

Figure 2:
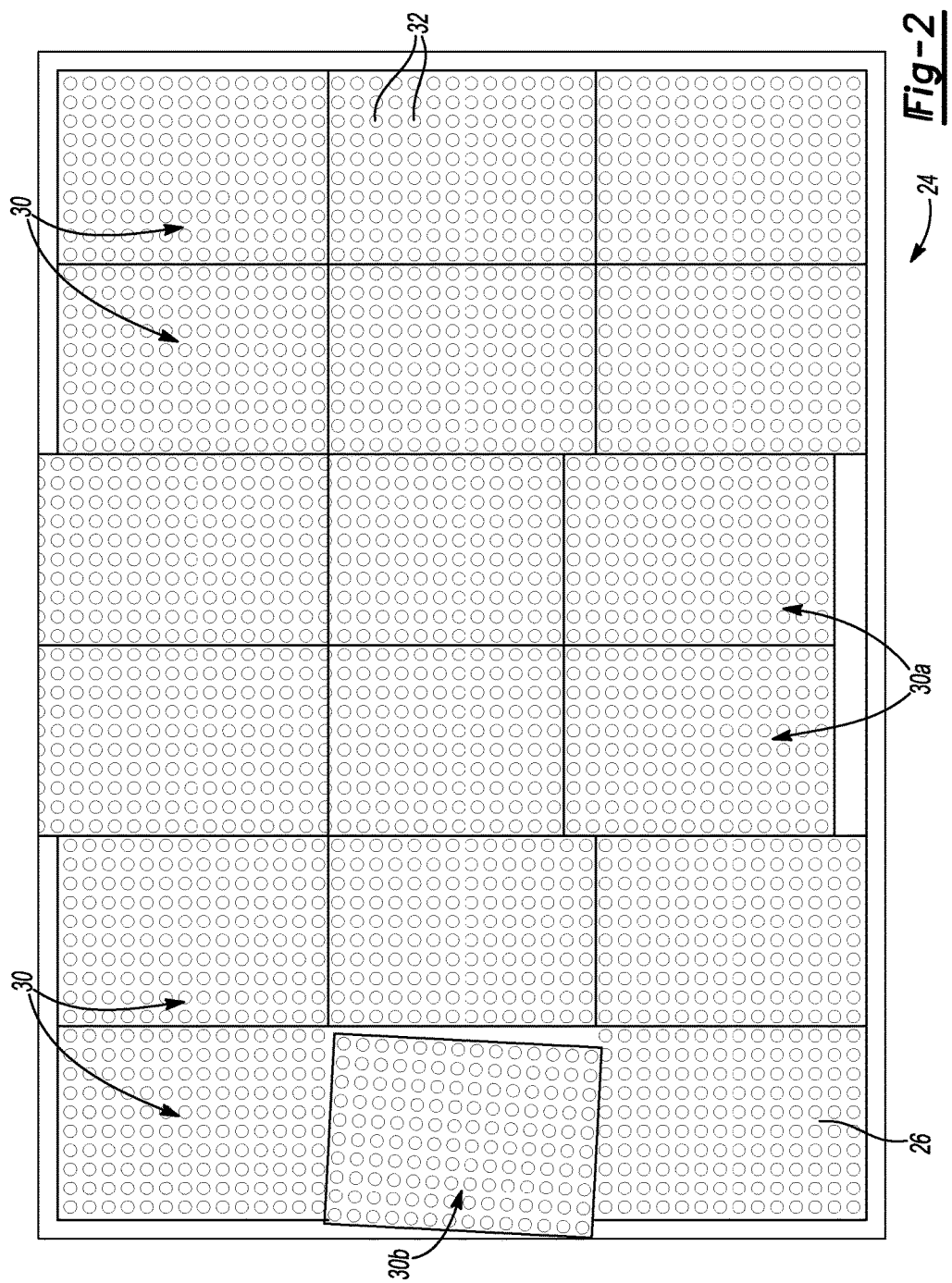
FIG. 2 is a top elevation view of an exemplary blank that has been improperly etched.

A known method for etching blanks 24 is to manually position an etching screen 22 on the blank 24 by hand. The etching screen 22, which may be a laser etching screen 22, is used to create one of the etched sections 30 and must be re-positioned to create the grid of etched sections 30. Unless particular care is given to ensure proper orientation, spacing, and alignment of the etching screen 22 with adjacent etched sections 30, misalignment of the etched sections 30 can occur. FIG. 2 illustrates a blank 24 that has unacceptable etching. In the example illustrated, some of the etched sections 30a are shifted longitudinally upward relative to laterally adjacent etched sections 30 of the grid. Another etched section 30b is rotated slightly clockwise relative to adjacent etched sections 30 so that the rotated etched section 30b appears tilted to the left. These are some examples of the many misalignment errors that can occur as a result of free-hand positioning of the etching screen 22 relative to the blank 24. In the event just one etched section 30 is misaligned, the entire blank 24 must be discarded. Accordingly, wasted scrap is often produced when blanks 24 are being etched in accordance with known methods.

The subject disclosure is directed to a blank etching apparatus 20 that accurately and repeatably positions the etching screen 22 relative to the blank 24 so as to reduce scrap and expedite the etching process for shorter blank etching times. For example, the Applicants have found that the time required to layout blanks 24 using the subject blank etching apparatus 20 is four times faster than known free-hand processes (e.g. approximately two hours per blank 24 versus approximately eight hours per blank 24).

Figure 3:
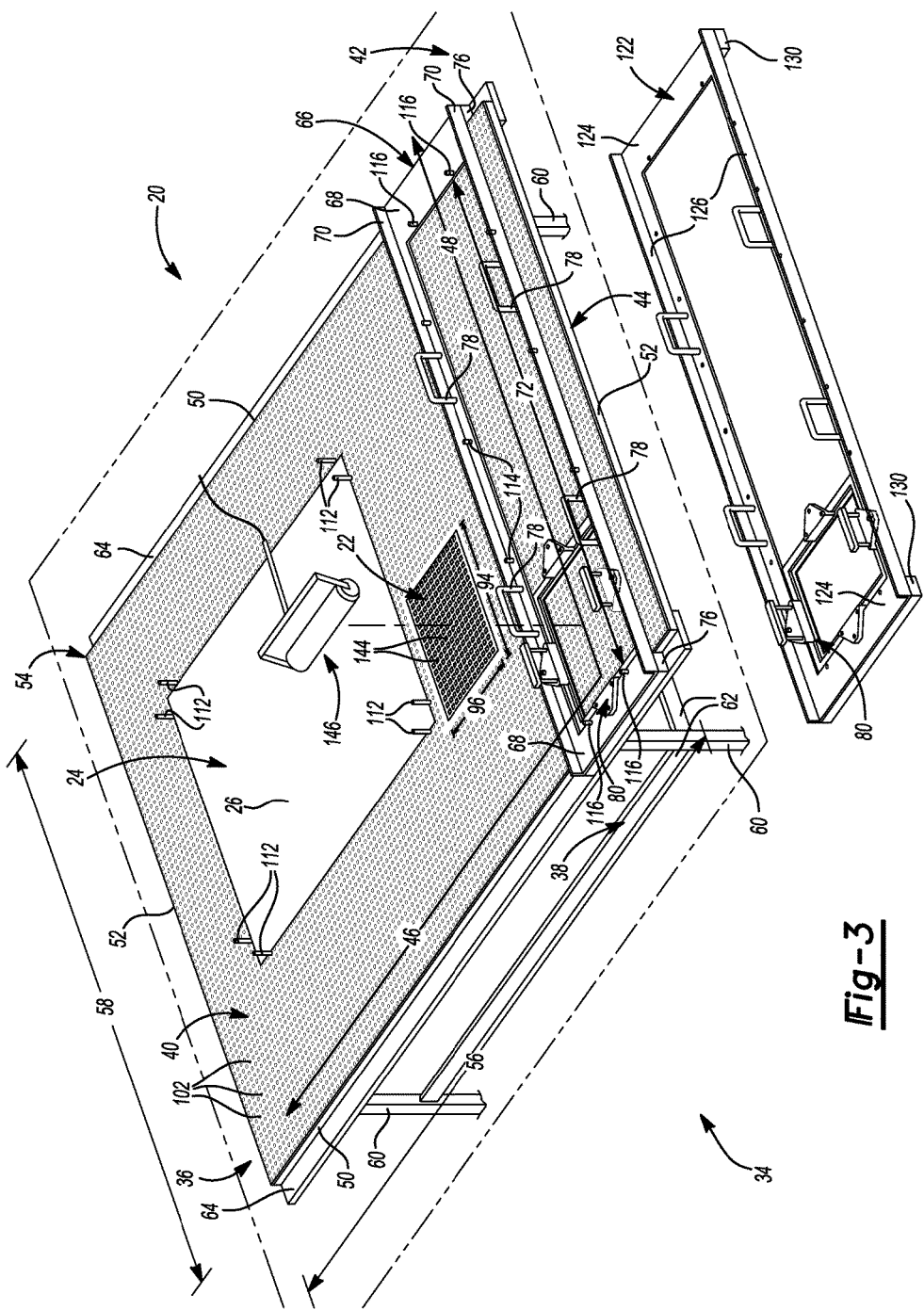
FIG. 3 is a front perspective view of an exemplary blank etching apparatus constructed in accordance with the subject disclosure.

With reference to FIG. 3, the blank etching apparatus 20 includes a worktable 34 having a table top 36 and a base 38. The base 38 supports the table top 36. When etching is carried out using the disclosed blank etching apparatus 20, the blank 24 to be etched is placed on the table top 36. More particularly, the table top 36 has a top surface 40 that supports the blank 24 in a support plane 42. The table top 36 also has a bottom surface 44 opposite the top surface 40 that faces away from the blank 24. The table top 36 defines an x-axis 46 and a y-axis 48 that is part of an x-y coordinate system 46, 48. The y-axis 48 is perpendicular to the x-axis 46 and both the x-axis 46 and the y-axis 48 extend in the support plane 42.

Although the table top 36 may be made to have a variety of different shapes without departing from the scope of the subject disclosure, the table top 36 illustrated in the Figures is planar and is rectangular. The table top 36 has a pair of lateral sides 50 that are substantially parallel to the x-axis 46 and a pair of longitudinal sides 52 that are substantially parallel to the y-axis 48. The pair of longitudinal sides 52 extend between the pair of lateral sides 50 such that the pair of lateral sides 50 and the pair of longitudinal sides 52 together define a perimeter 54 of the table top 36. Overall, the table top 36 has a lateral dimension 56 that is measured along the x-axis 46 and a longitudinal dimension 58 that is measured along the y-axis 48. Each of the pair of lateral sides 50 has a length that equals the lateral dimension 56 of the table top 36 and each of the pair of longitudinal sides 52 has a length that equals the longitudinal dimension 58 of the table top 36. Furthermore, the table top 36 may be dimensionally larger than the blank 24 where the lateral dimension 56 of the table top 36 is larger than the lateral length L1 of the blank 24 and the longitudinal dimension 58 of the table top 36 is larger than the longitudinal length L2 of the blank 24.

The base 38 includes a plurality of legs 60 that extend downwardly from the bottom surface 44 of the table top 36. The base 38 may also include a plurality of cross-members 62 that extend between, and interconnect, the plurality of legs 60. As shown in FIG. 3, the plurality of cross-members 62 may generally be spaced from the bottom surface 44 of the table top 36 and may be substantially parallel to the bottom surface 44 of the table top 36. The table top 36 may simply rest on the base 38 or the table top 36 may be connected to the base 38. Where the table top 36 is connected to the base 38, the connection between the table top 36 and the base 38 may be permanent or detachable to provide easy removal of the table top 36 from the base 38. It should also be appreciated that the base 38 itself is optional, as the table top 36 may be integrated into a counter, an elevated work-space, or an existing manufacturing line or machine.

Figure 4:
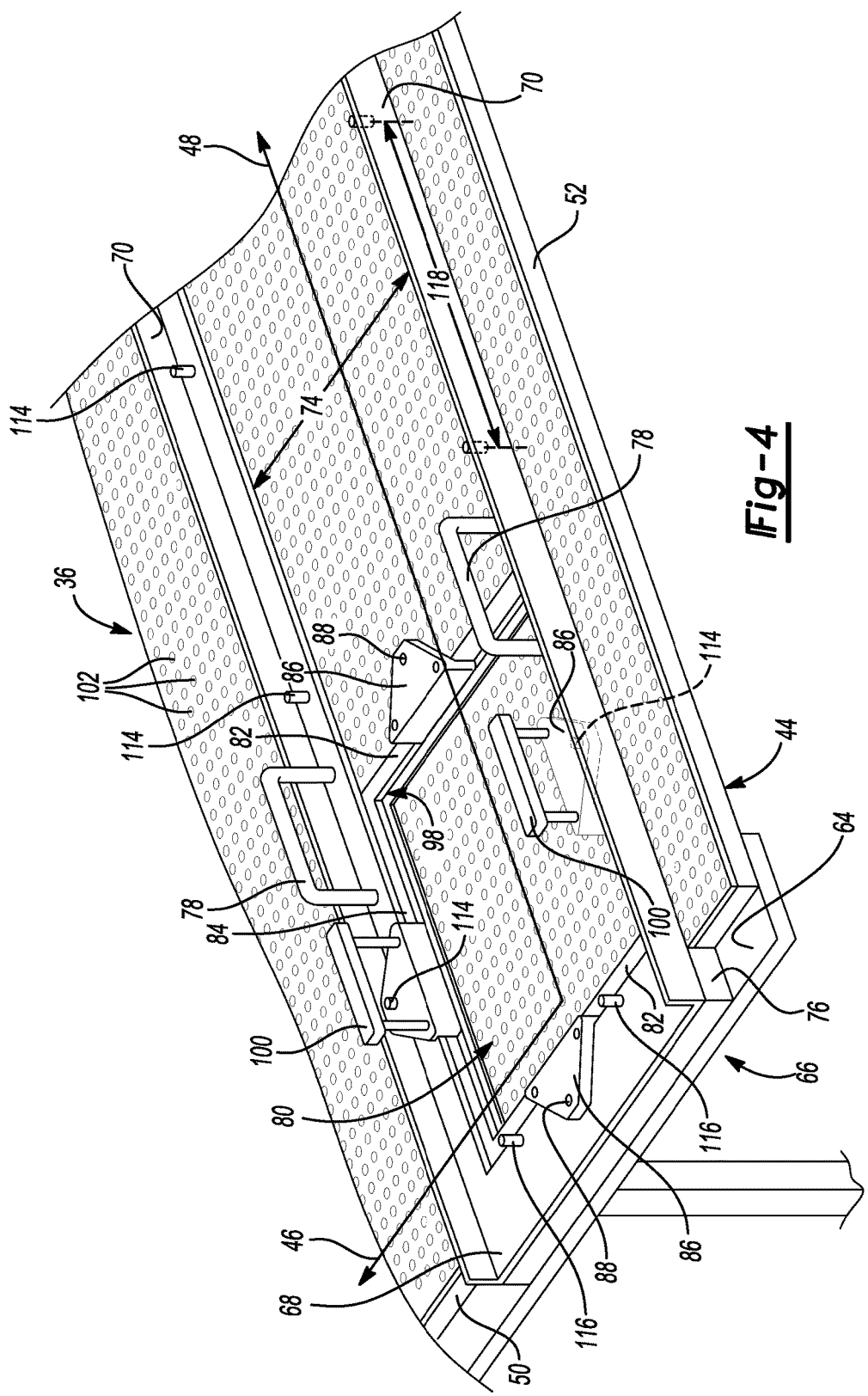
FIG. 4 is an enlarged, partial front perspective view of the exemplary blank etching apparatus shown in FIG. 3.

Referring now to FIG. 4, the blank etching apparatus 20 includes a pair of slides 64 that extend along the pair of lateral sides 50 of the table top 36 respectively. The pair of slides 64 are generally planar and abut the bottom surface 44 of the table top 36 adjacent the pair of lateral sides 50. Accordingly, the pair of slides 64 form an L-shaded cross-section with the table top 36 at the pair of lateral sides 50. The pair of slides 64 may be co-extensive with the pair of lateral sides 50 along the x-axis 46 such that the pair of slides 64 have a length that equals the length of the pair of lateral sides 50 and the lateral dimension 56 of the table top 36.

Figure 5A:
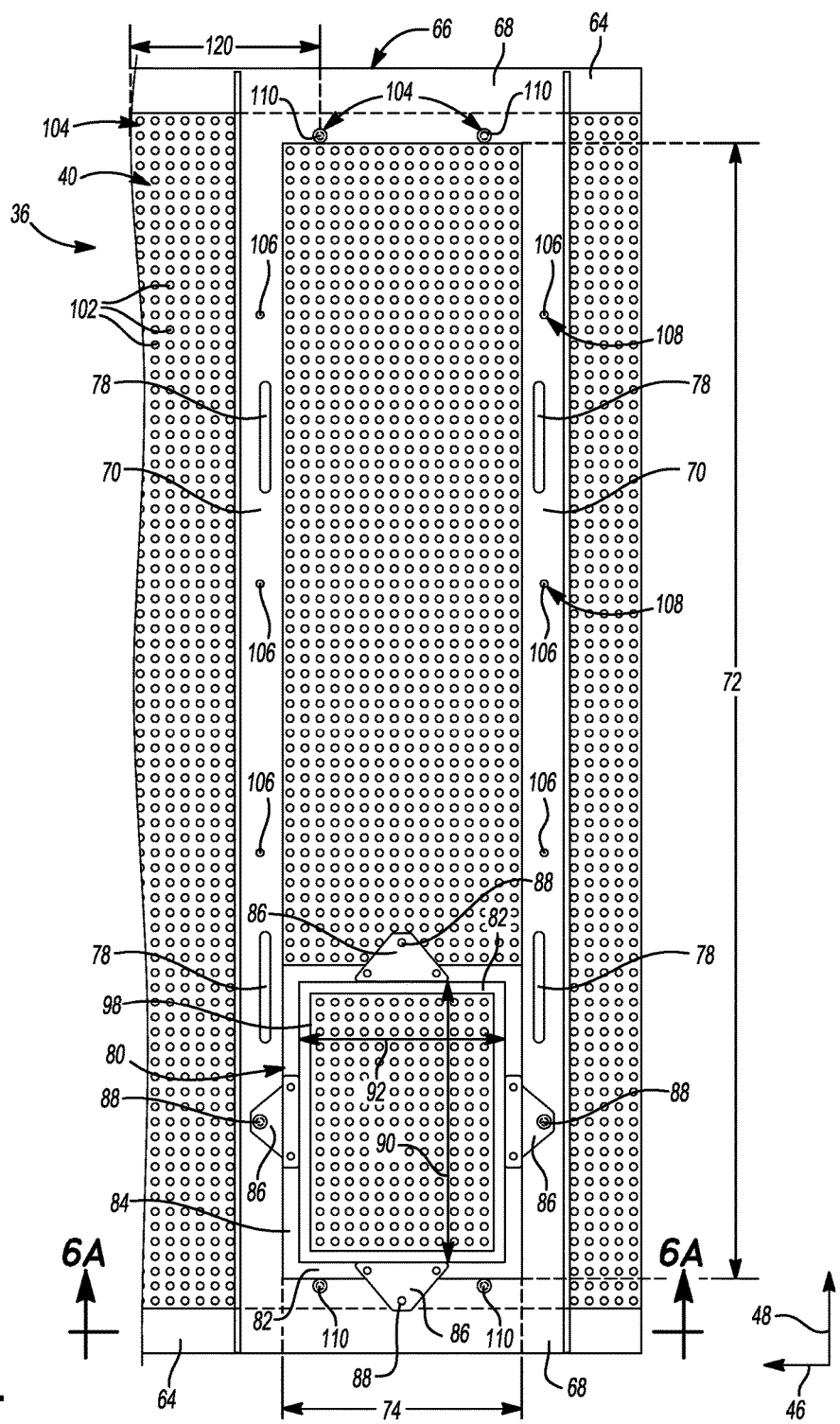
FIG. 5A is a partial top elevation view of the exemplary blank etching apparatus shown in FIG. 3 where the table top is supporting the first jig and the screen frame is positioned in a portrait orientation with respect to the table top.

As shown in FIGS. 3, 4, and 5A, the blank etching apparatus 20 includes a first jig 66 that is movable with respect to the table top 36 along the x-axis 46. The first jig 66 is supported on the pair of slides 64 such that the first jig 66 may traverse the table top 36 in a direction that is substantially parallel to the x-axis 46, while remaining fixed with respect to the table top 36 along the y-axis 48. The first jig 66 includes a first pair of lateral segments 68 that are substantially parallel to the x-axis 46. The first jig 66 also includes a first pair of longitudinal segments 70 that are substantially parallel to the y-axis 48. The first pair of longitudinal segments 70 extend between the first pair of lateral segments 68 giving the first jig 66 a rectangular, frame-like structure. The first pair of lateral segments 68 are generally disposed adjacent to and above the pair of lateral sides 50 of the table top 36. Although the first jig 66 may have a variety of different sizes, the first pair of longitudinal segments 70 may be longer than the longitudinal dimension 58 of the table top 36 and the first pair of lateral segments 68 may be shorter than the lateral dimension 56 of the table top 36. Additionally, the first pair of lateral segments 68 are spaced from one another by a first longitudinal distance 72 that is measured along the y-axis 48 and the first pair of longitudinal segments 70 are spaced from one another by a first lateral distance 74 that is measured along the x-axis 46. The first longitudinal distance 72, which is measured between the first pair of lateral segments 68, may be smaller than the longitudinal dimension 58 of the table top 36. Similarly, the first lateral distance 74, which is measured between the first pair of longitudinal segments 70, may be smaller than the lateral dimension 56 of the table top 36.

As best seen in FIG. 4, the first jig 66 may include a first pair of guides 76 disposed adjacent to and below the first pair of lateral segments 68. Accordingly, the first pair of guides 76 are substantially parallel to the x-axis 46. The first pair of guides 76 may additionally be co-extensive with the first pair of lateral segments 68 along the x-axis 46. In other words, the first pair of guides 76 may be the same length as the first pair of lateral segments 68. The first pair of guides 76 generally support the first jig 66 on the pair of slides 64 and guide movement and orientation of the first jig 66 relative to the table top 36. Because the first pair of guides 76 extend downwardly from the first jig 66 and are substantially parallel to the pair of the lateral sides 50 of the table top 36, the first pair of guides 76 limit movement of the first jig 66 to movement along the x-axis 46 and prevent the first jig 66 from rotating with respect to the table top 36 or moving in a direction that is parallel to the y-axis 48.

In some configurations, each of the first pair of longitudinal segments 70 of the first jig 66 has a "L" shaped cross-section. This gives the first jig 66 a trough-shaped cross-section when viewed from a point disposed along the y-axis 48. The trough-shaped cross-section is advantageous because it increases the rigidity of the first jig 66 and specifically the rigidity of the first pair of longitudinal segments 70, which are generally longer and thus more susceptible to bending than the first pair of lateral segments 68. The first jig 66 may additionally include a first plurality of handles 78 that are disposed along the first pair of longitudinal segments 70. The first plurality of handles 78 thus assist a user in moving the first jig 66 on the table top 36, placing the first jig 66 on the table top 36, and removing the first jig 66 from the table top 36.

As shown generally in FIGS. 3, 4, and 5A, the blank etching apparatus 20 includes a screen frame 80 that receives and carries the etching screen 22. The screen frame 80 is received between the first pair of longitudinal segments 70 and the first pair of lateral segments 68 of the first jig 66 and is moveable along the y-axis 48 relative to the first jig 66 and the table top 36. The screen frame 80 includes a first pair of frame members 82 and a second pair of frame members 84 that are spaced from one another by the first pair of frame members 82. As shown in the Figures, the etching screen 22 may be rectangular. Where the screen frame 80 is rectangular, the second pair of frame members 84 are longer than the first pair of frame members 82 so that the screen frame 80 can accommodate the rectangular shape of the etching screen 22. Each frame member of the first pair of frame members 82 and the second pair of frame members 84 may have a wing 86 that extends outwardly therefrom. The wing 86 includes pin hole 88 and may be either integrally formed with each frame member or a separate part that is attached to each frame member. It should be appreciated that the screen frame 80 may be provided with a different number of wings 86 than the four wings 86 shown in the Figures. By way of example and without limitation, the screen frame 80 may be provided with two wings 86, where only the first pair of frame members 82 or the second pair of frame members 84 includes the wings 86.

The first pair of frame members 82 may be substantially parallel to and spaced from one another by a first inner dimension 90 and the second pair of frame members 84 may be substantially parallel to and spaced from one another by a second inner dimension 92. Accordingly, the screen frame 80 may have a rectangular, frame-like structure. The etching screen 22 has a first outer dimension 94 and a second outer dimension 96 that generally correspond with the first inner dimension 90 and the second inner dimension 92 of the screen frame 80 to provide a clearance fit between the etching screen 22 and the screen frame 80. In one configuration, each frame member of the first pair of frame members 82 and the second pair of frame members 84 has a stepped edge 98. The stepped edge 98 gives each frame member of the first pair of frame members 82 and the second pair of frame members 84 a "L" shaped cross-section. The stepped edge 98 of each frame member cooperates to form an inset area that receives the etching screen 22. Therefore, for configurations that include the optional stepped edge 98, the first and second inner dimensions 90, 92 of the screen frame 80 are measured between the stepped edges 98 of the first pair of frame members 82 and the stepped edges 98 of the second pair of frame members 84 rather than between first pair of frame members 82 and the second pair of frame members 84 themselves. The screen frame 80 may also optionally include a pair of handles 100 disposed along the first pair of frame members 82 or the second pair of frame members 84. The pair of handles 100 assists a user in moving the screen frame 80 on the table top 36 relative to the first jig 66, placing the screen frame 80 on the table top 36, and removing the screen frame 80 from the table top 36.

As best seen in FIG. 5A, the table top 36 includes a plurality of perforations 102 that span the top surface 40 of the table top 36 between the pair of lateral sides 50 and the pair of longitudinal sides 52. The plurality of perforations 102 defines several incremental jig positions 104, as will be explained in greater detail below. It should also be appreciated that the plurality of perforations 102 may or may not extend through the table top 36 from the top surface 40 to the bottom surface 44; however, each perforation of the plurality of perforations 102 is open to the top surface 40 of the table top 36. The first jig 66 may include a first plurality of locator holes 106 disposed along the first pair of longitudinal segments 70 that define several incremental screen frame positions 108. The first plurality of locator holes 106 may or may not extend entirely through the first pair of longitudinal segments 70 and may or may not be aligned with at least some perforations of the plurality of perforations 102. The first jig 66 may also include a second plurality of locator holes 110 disposed along the first pair of lateral segments 68. The second plurality of locator holes 110 may extend entirely through said first pair of lateral segments 68 and may be aligned with at least some perforations of the plurality of perforation 102 in the table top 36.

As shown in FIG. 3, the blank etching apparatus 20 includes a first plurality of locator pins 112 that are received in at least some perforations of the plurality of perforations 102 in the top surface 40 of the table top 36. The first plurality of locator pins 112 project from the top surface 40 and locate and align the blank 24 on the table top 36 relative to the x-axis 46 and the y-axis 48. Although the number of locator pins in the first plurality of locator pins 112 may vary, there are a total of eight locator pins in the first plurality of locators pins 112 shown in FIG. 3, with two locator pins of the first plurality of locator pins 112 on each side of the blank 24.

As shown in FIGS. 3 and 4, the blank etching apparatus 20 also includes a second plurality of locator pins 114 that are received in at least some of the pin holes 88 in the wings 86 of the screen frame 80 and at least some of the first plurality of locator holes 106 in the first pair of longitudinal segments 70 of the first jig 66. The second plurality of locator pins 114 extend through the pin holes 88 in the wings 86 and into at least some of the first plurality of locator holes 106 in the first pair of longitudinal segments 70 of the first jig 66. Accordingly, the second plurality of locator pins 114 fix the screen frame 80 in place with respect to the first jig 66 in one of the several incremental screen frame positions 108. This also prevents movement of the screen frame 80 relative to the first jig 66 along the y-axis 48. The first plurality of locator holes 106 may be spaced apart from one another by a first spacing distance 118 that is substantially equal to the first inner dimension 90 of the screen frame 80 such that a continuous repeating pattern of geometric units 32 can quickly and easily be etched into the blank 24. Although the number of locator pins in the second plurality of locator pins 114 may vary, there are a total of eight locator pins in the second plurality of locators pins 114 shown in FIG. 4.

As shown in FIGS. 3 and 4, the blank etching apparatus 20 may further include a third plurality of locator pins 116 that are received in at least some of the second plurality of locator holes 110 in the first pair of lateral segments 68 of the first jig 66 and at least some of the plurality of perforations 102 in the top surface 40 of the table top 36. The third plurality of locator pins 116 extends through the second plurality of locator holes 110 in the first pair of lateral segments 68 and into at least some of the plurality of perforations 102 in the top surface 40 of the table top 36 to fix the first jig 66 in place with respect to the table top 36 in one of the several incremental jig positions 104. This also prevents movement of the first jig 66 relative to the table top 36 along the x-axis 46. At least some of the plurality of perforations 102 may be spaced apart from one another by a second spacing distance 120 that is substantially equal to the second inner dimension 92 of the screen frame 80 such that a continuous repeating pattern of geometric units 32 can quickly and easily be etched into the blank 24. Notwithstanding, there may be one or more perforations 102 disposed along the second spacing distance 120 meaning that there may be some of perforations disposed between the perforations that define the second spacing distance 120 (e.g. see FIG. 5A). Although the number of locator pins in the third plurality of locator pins 116 may vary, there are a total of four locator pins in the third plurality of locators pins 116 shown in FIG. 3. It should also be appreciated that the third plurality of locator pins 116 and the second plurality of locator holes 110 may be eliminated where the first plurality of locator holes 106 extend entirely through the first pair of longitudinal segments 70 of the first jig 66 and are aligned with at least some of the plurality of perforations 102 in the table top 36. In such a configuration, the second plurality of locator pins 114 can be sized such that they extend through the pin holes 88 in the wings 86 of the screen frame 80, the first plurality of locator holes 106 in first pair of longitudinal segments 70 of the first jig 66, and into at least some of the plurality of perforations 102 in the table top 36 to fix both the screen frame 80 and the first jig 66 in place with respect to the table top 36.

Figure 5B:
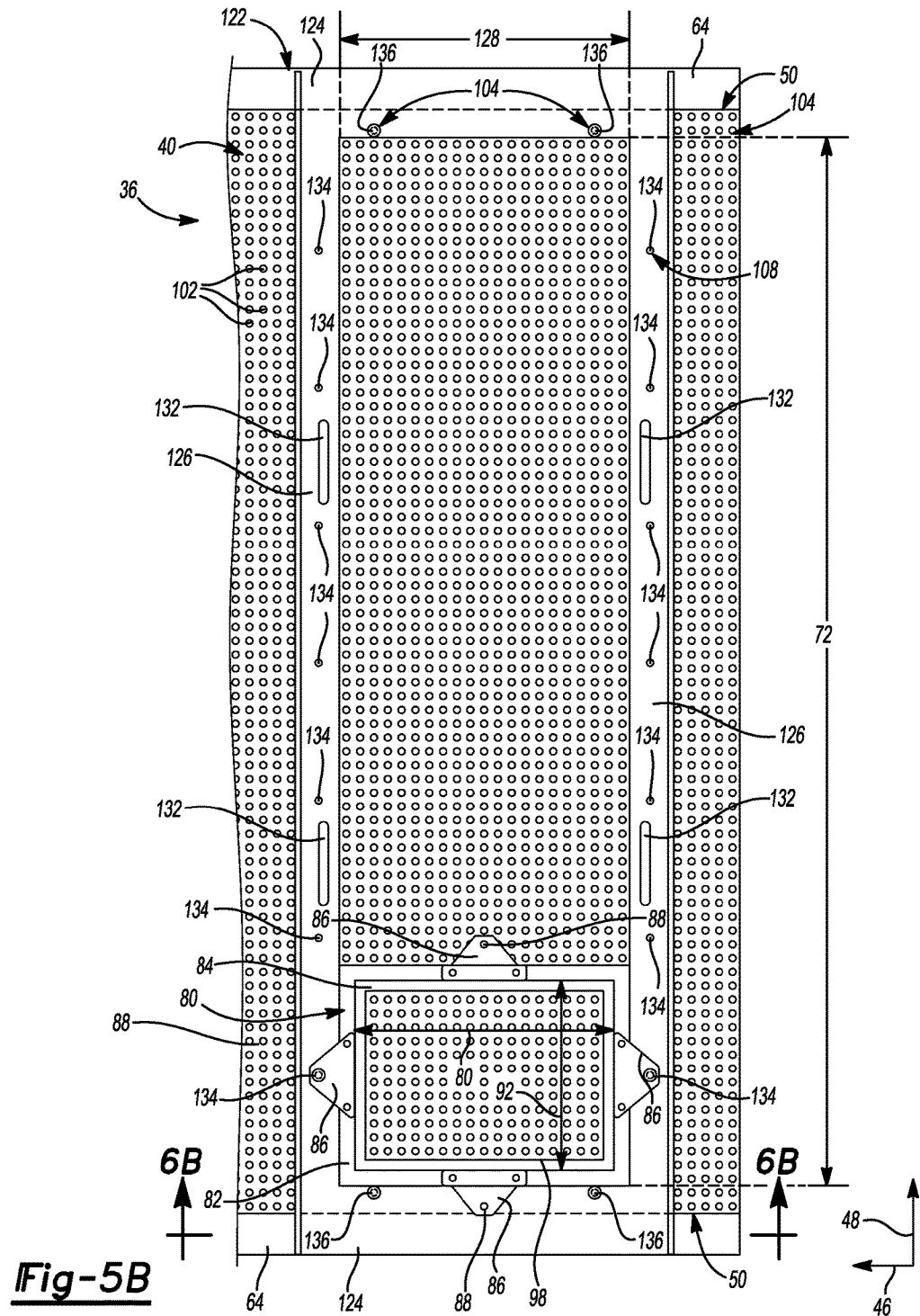
FIG. 5B is a partial top elevation view of the exemplary blank etching apparatus shown in FIG. 3 where the table top is supporting the second jig and the screen frame is positioned in a landscape orientation with respect to the table top.

Referring now to FIGS. 3 and 5B, the blank etching apparatus 20 may also include a second jig 122 that is movable with respect to the table top 36 along the x-axis 46 and that is fixed with respect to the table top 36 along the y-axis 48. The second jig 122 is supported on the pair of slides 64 and includes a second pair of lateral segments 124 that are substantially parallel to the x-axis 46. The second jig 122 also includes a second pair of longitudinal segments 126 that are substantially parallel to the y-axis 48 between the second pair of lateral segments 124. The second pair of lateral segments 124 are disposed adjacent to and above the pair of lateral sides 50 of the table top 36. The second pair of lateral segments 124 are spaced from one another by the first longitudinal distance 72. The second pair of longitudinal segments 70 are spaced from one another by a second lateral distance 128 that is measured along the x-axis 46. The second jig 122 includes a second pair of guides 130 disposed adjacent a below the second pair of lateral segments 124. The second pair of guides 130 are substantially parallel to the x-axis 46 and may be co-extensive with the second pair of lateral segments 124 along the x-axis 46. In other words, the second pair of guides 130 and the second pair of lateral segments 124 may be the same length. The second pair of guides 130 support the second jig 122 on the pair of slides 64 and guide movement and orientation of the second jig 122 relative to the table top 36. Because the second pair of guides 130 extend downwardly from the second jig 122 and are substantially parallel to pair of the lateral sides 50 of the table top 36, the second pair of guides 130 limit movement of the second jig 122 to movement along the x-axis 46 and prevent the second jig 122 from rotating with respect to the table top 36 or moving in a direction that is parallel to the y-axis 48.

The second lateral distance 128, as measured between the second pair of longitudinal segments 126 of the second jig 122, is larger than the first lateral distance 74 (i.e. the distance measured between the first pair of longitudinal segments 70 of the first jig 66). Accordingly, the second pair of lateral segments 124 of the second jig 122 are longer than the first pair of lateral segments 68 of the first jig 66. This allows the second jig 122 to receive the screen frame 80 in an orientation that is rotated ninety degrees from an orientation of the screen frame 80 when the screen frame 80 is received by the first jig 66. In other words, the geometry of the first jig 66 may provide portrait orientation of the screen frame 80 and the etching screen 22 relative to the table top 36 (e.g. see FIG. 5A) while the geometry of the second jig 122 may provide landscape orientation of the screen frame 80 and the etching screen 22 relative to the table top 36 (e.g. see FIG. 5B). Thus, where the blank etching apparatus 20 includes the first jig 66 and the second jig 122, the first jig 66 and the second jig 122 are used interchangeably depending on the desired orientation of the screen frame 80.

As with the first jig 66, each of the second pair of longitudinal segments 126 of the second jig 122 may have a "L" shaped cross-section. Accordingly, the second jig 122 may have a trough-shaped cross-section when viewed from a point disposed along the y-axis 48 to increase rigidity of the second jig 122. As shown in FIG. 5B, the second jig 122 may include a second plurality of handles 132 that are disposed along the second pair of longitudinal segments 126. The second plurality of handles 132 assist in movement of the second jig 122 on the table top 36 along the x-axis 46, in placement of the second jig 122 on the table top 36, and in removal of the second jig 122 from the table top 36. The second jig 122 may also include a third plurality of locator holes 134 disposed along the second pair of longitudinal segments 126. The third plurality of locator holes 134 define the several incremental screen frame positions 108. The second jig 122 may additionally include a fourth plurality of locator holes 136 is disposed along the second pair of lateral segments 124.

When the second jig 122 is being utilized, the second plurality of locator pins 114 are received in at least some of the pin holes 88 in the wings 86 of the screen frame 80 and at least some of the third plurality of locator holes 134 in the second pair of longitudinal segments 126 of the second jig 122. Accordingly, the second plurality of locator pins 114 fix the screen frame 80 in place with respect to the second jig 122 in one of the several incremental screen frame positions 108 and also prevent movement of the screen frame 80 relative to the second jig 122 along the y-axis 48. When the second jig 122 is being utilized, the third plurality of locator pins 116 extend through the fourth plurality of locator holes 136 in the second pair of lateral segments 124 and into at least some of the plurality of perforations 102 in the top surface 40 of the table top 36 to fix the second jig 122 in place with respect to the table top 36 in one of the several incremental jig positions 104. This prevents movement of the second jig 122 relative to the table top 36 along the x-axis 46. Again, the number of locator pins in the second and third plurality of locator pins 114, 116 may vary from the number shown in FIG. 3. It should also be appreciated that the third plurality of locator pins 116 and the fourth plurality of locator holes 136 may be eliminated where the third plurality of locator holes 134 extend entirely through the second pair of longitudinal segments 126 of the second jig 122 and are aligned with at least some of the plurality of perforations 102 in the table top 36. In such a configuration, the second plurality of locator pins 114 can be sized such that they extend through the pin holes 88 in the wings 86 of the screen frame 80, the third plurality of locator holes 134 in second pair of longitudinal segments 126 of the second jig 122, and into at least some of the plurality of perforations 102 in the table top 36 to fix both the screen frame 80 and the second jig 122 in place with respect to the table top 36.

With reference to FIG. 6A, the first jig 66 may include a first plurality of rollers 138 disposed between the first jig 66 and the pair of slides 64. The first plurality of rollers 138 are rotatably supported on the first jig 66 and cooperate with the first pair of guides 76 to support the first jig 66 on the pair of slides 64. The first plurality of rollers 138 also help guide movement and orientation of the first jig 66 relative to the table top 36. With reference to FIG. 6B, the second jig 122 may include a second plurality of rollers 140 disposed between the second jig 122 and the pair of slides 64. The second plurality of rollers 140 are rotatably supported on the second jig 122 and cooperate with the second pair of guides 130 to support the second jig 122 on the pair of slides 64. The second plurality of rollers 140 also help guide movement and orientation of the second jig 122 relative to the table top 36. The first plurality of rollers 138 and the second plurality of rollers 140 may be supported on the first and second jigs 66, 122, respectively, in various ways. For example and without limitation, FIG. 6A shows that each roller of the first plurality of rollers 138 may be supported on an axel 142 that is coupled to and extends from the first pair of guides 76. FIG. 6B shows that each roller of the second plurality of rollers 140 may be supported on an axel 142 that is coupled to and extends from the second pair of lateral segments 124. These configurations are merely exemplary as other roller configurations are possible. It should also be appreciated that both the first jig 66 and the second jig 122 may have the same roller configuration or different roller configurations. FIGS. 6A and 6B also show that, when the blank etching apparatus 20 is in use, the blank 24 is disposed between the top surface 40 of the table top 36 on one side and the screen frame 80 and one of the first pair of longitudinal segments 70 of the first jig 66 or the second pair of longitudinal segments 126 of the second jig 122 on an opposite side of the blank 24. In this way, the second face 28 of the blank 24 is supported by the table top 36 and the screen frame 80 and the first or second jig 66, 122 support the etching screen 22 on or above the first face 26 of the blank 24.

Although the blank etching apparatus 20 set forth above, including its various components, may be made of a wide variety of different materials, in one exemplary configuration, the table top 36, the first jig 66, the second jig 122, and the screen frame 80 are all made of a high density plastic material. Further, the material of the first jig 66, the second jig 122, and the screen frame 80 may be translucent or transparent to help with positioning the first jig 66, the second jig 122, and the screen frame 80 relative to the blank 24, since the blank 24 and the etched sections 30 may be visible through such materials. The base 38, including the plurality of legs 60 and the plurality of cross-members 62, on the other hand, may be made of a metal material for enhanced stability and strength. As previously stated, the etching screen 22 may be a laser etching screen 22. The laser etching screen 22 may be, for example, part of a laser etching/engraving system, such as one of the laser etching/engraving systems manufactured by SA Argus Laser Machines. Such systems may include a print head and/or roller 146 that applies the etching to the blank 24. In some configurations, the print head and/or roller 146 may be electrically charged to apply an electrically active etching medium (such as an ink) to the blank 24 through orifices 144 in the etching screen 22.

Many other modifications and variations of the present disclosure are possible in light of the above teachings and may be practiced otherwise than as specifically described while within the scope of the appended claims. These antecedent recitations should be interpreted to cover any combination in which the inventive novelty exercises its utility. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described.

What is claimed is:

1. A blank etching apparatus that positions an etching screen relative to a blank comprising:
   a worktable including a table top and a base that supports said table top;
   said table top having a top surface that supports the blank in a support plane that defines an x-axis and a y-axis;
   said table top having a pair of lateral sides and a pair of longitudinal sides that extend between said pair of lateral sides;
   a first jig that is movable with respect to said table top along said x-axis and that is fixed with respect to said table top along said y-axis, said first jig including a first pair of lateral segments that are disposed adjacent said pair of lateral sides of said table top and a first pair of longitudinal segments that extend between said first pair of lateral segments; and
   a screen frame received between said first pair of longitudinal segments and said first pair of lateral segments of said first jig that is moveable along said y-axis relative to said first jig and said table top and that receives and carries the etching screen where said first jig and said screen frame cooperate to accurately and repeatably position the etching screen relative to the blank.

2. A blank etching apparatus as set forth in claim 1 wherein said screen frame includes a first pair of frame members and a second pair of frame members that are spaced from one another by said first pair of frame members.

3. A blank etching apparatus as set forth in claim 2 wherein each frame member of said first pair of frame members and said second pair of frame members has a wing extending outwardly therefrom that includes pin hole.

4. A blank etching apparatus as set forth in claim 3 wherein said first jig includes a plurality of locator holes disposed along said first pair of longitudinal segments that define several incremental screen frame positions.

5. A blank etching apparatus as set forth in claim 4 further including a plurality of locator pins received in at least some of said pin holes in said wings of said screen frame that extend through said wings and into at least some of said plurality of locator holes in said first pair of longitudinal segments of said first jig to fix said screen frame to said first jig in one of said several incremental screen frame positions and prevent movement of said screen frame relative to said first jig along said y-axis.

6. A blank etching apparatus as set forth in claim 2 wherein said second pair of frame members are longer than said first pair of frame members.

7. A blank etching apparatus as set forth in claim 6 wherein said first pair of longitudinal segments are spaced from one another by a first lateral distance that is measured along said x-axis.

8. A blank etching apparatus as set forth in claim 7 further including a second jig that is movable with respect to said table top along said x-axis and that is fixed with respect to said table top along said y-axis, said second jig being supported on said pair of slides and including a second pair of lateral segments that extend along said x-axis and a second pair of longitudinal segments that extend along said y-axis between said second pair of lateral segments, wherein said first jig and said second jig are used interchangeably depending on a desired orientation of said screen frame.

9. A blank etching apparatus as set forth in claim 8 wherein said second pair of longitudinal segments are spaced from one another by a second lateral distance that is measured along said x-axis, said second lateral distance between said second pair of longitudinal segments of said second jig being larger than said first lateral distance such that said second pair of lateral segments of said second jig are longer than said first pair of lateral segments of said first jig to allow said second jig to receive said screen frame in an orientation that is rotated ninety degrees from an orientation of said screen frame when said screen frame is received by said first jig.

10. A blank etching apparatus as set forth in claim 2 wherein each frame member of said first pair of frame members and said second pair of frame members has a stepped edge that forms an inset area in said screen frame that receives the etching screen.

11. A blank etching apparatus as set forth in claim 1 wherein said table top includes a plurality of perforations spanning said top surface of said table top between said pair of lateral sides and said pair of longitudinal sides that define several incremental jig positions.

12. A blank etching apparatus as set forth in claim 11 wherein said first jig includes a plurality of locator holes disposed along said first pair of lateral segments.

13. A blank etching apparatus as set forth in claim 12 further including a plurality of locator pins received in at least some of said plurality of locator holes in said first pair of lateral segments of said first jig that extend through said first pair of lateral segments and into at least some of said plurality of perforations in said top surface of said table top to fix said first jig to said table top in one of said several incremental jig positions and prevent movement of said first jig relative to said table top along said x-axis.

14. A blank etching apparatus as set forth in claim 11 further including a plurality of locator pins received in at least some of said plurality of perforations in said top surface of said table top that project from said top surface and locate and align the blank on said table top relative to said x-axis and said y-axis.

15. A blank etching apparatus as set forth in claim 1 further including a pair of slides extending along said pair of lateral sides of said table top respectively that are planar and abut a bottom surface of said table top adjacent said pair of lateral sides to form an L-shaded cross-section with said table top at said pair of lateral sides.

16. A blank etching apparatus as set forth in claim 15 wherein said first jig includes a first pair of guides disposed adjacent to a below said first pair of lateral segments that are parallel to said x-axis such that said first pair of guides support said first jig on said pair of slides and guide movement and orientation of said first jig relative to said table top.

17. A blank etching apparatus as set forth in claim 16 wherein said first jig includes a first plurality of rollers disposed between said first jig and said pair of slides that are rotatably supported on said first jig and that cooperate with said first pair of guides to support said first jig on said pair of slides and guide movement and orientation of said first jig relative to said table top.

18. A blank etching apparatus as set forth in claim 1 wherein said table top is rectangular and said x-axis is perpendicular to said y-axis.

19. A blank etching apparatus as set forth in claim 1 wherein each of said first pair of longitudinal segments has a L-shaped cross-section such that said first jig has a trough-shaped cross-section when viewed from a point disposed along said y-axis to increase rigidity of said first jig.

* * * * *